Jan. 13, 1931. A. HOLZ 1,788,952
PROCESS FOR THE COMMERCIAL PRODUCTION OF DI-CALCIUM PHOSPHATE
Filed April 21, 1927
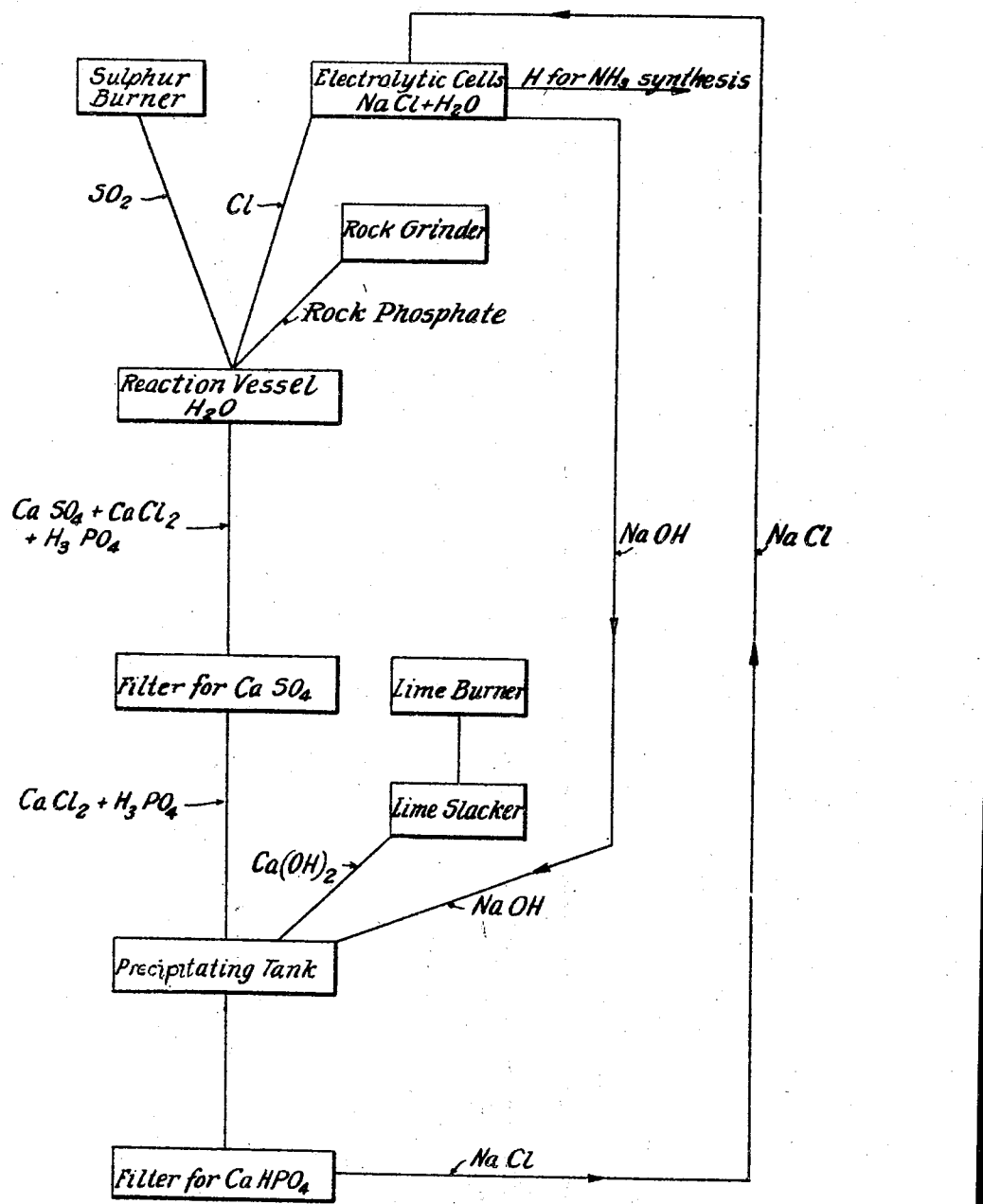
INVENTOR
August Holz
BY
Frak C Fischer
ATTORNEY Patented Jan. 13, 1931

1,788,952

UNITED STATES PATENT OFFICE

AUGUST HOLZ, OF IRVINGTON, NEW JERSEY, ASSIGNOR TO THEODORE V. D. BERDELL, OF NEW YORK, N. Y.

PROCESS FOR THE COMMERCIAL PRODUCTION OF DI-CALCIUM PHOSPHATE

Application filed April 21, 1927. Serial No. 185,667.

This invention relates more particularly to the commercial production, in a continuous process, of di-calcium phosphate by electrolytic treatment of alkali-metal chlorides, so as to utilize certain of the products to produce di-calcium phosphate by treating tri-calcium phosphate.

Di-calcium phosphate is a compound, which owing to its neutral character, non-hygroscopic qualities and high available phosphoric acid contents would form a very valuable fertilizer if it could be produced at a low enough cost to compete with ordinary commercial fertilizers.

In my pending applications, Serial No. 91,819, filed March 2, 1926, and Serial No. 135,489, filed September 14, 1926, I have disclosed novel methods of producing di-calcium phosphate electrolytically. In both methods, however, it is necessary to re-combine the liberated hydrogen and chlorine in order to obtain the required hydrochloric acid, thus depriving the processes of a very valuable by-product (pure hydrogen). It is evident that this might prove to be an expensive procedure and a very serious obstacle to the commercial exploitation of these processes. In my improved process, herein described, it is proposed to overcome this objection and therefore, I have evolved a process adapted to bring about the union of chlorine with hydrogen in a much more economical way, which leaves the electrolytically obtained hydrogen as a by-product, available for other purposes, as for instance, the synthesis of ammonia.

In practicing my process, as herein described, and as illustrated by the accompanying flowsheet, I electrolyze a solution of commercial alkali-metal chloride, for instance sodium chloride, by means of an electric current. During such electrolysis chlorine will be liberated from the anode, while at the cathode the alkali-metal ions will combine with the water, forming alkali-metal hydroxides and liberating hydrogen.

As six molecules of chlorine are necessary for the decomposition of every molecule of tri-calcium phosphate—which, as rock phosphate, is the raw material of my process—the following equation indicates the reaction:—

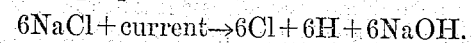
$$6NaCl + current \rightarrow 6Cl + 6H + 6NaOH.$$

The liberated gases hydrogen and chlorine are collected separately. The hydrogen, as previously indicated, is of high purity and therefore available for other purposes, for instance, for the synthesis of ammonia. The chlorine gas, however, is passed into water, into which an equivalent amount of sulphur dioxide gas is fed simultaneously. Both gases, by mutual reaction in the presence of water, form hydrochloric and sulphuric acids, according to the following equation:—

$$6Cl + 3SO_2 + 6H_2O \rightarrow 6HCl + 3H_2SO_4.$$

This mixture of hydrochloric and sulphuric acids is now allowed to act on crude rock phosphate (tri-calcium phosphate) according to the following equation:—

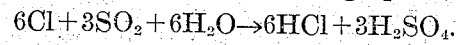
$$6HCl + 3H_2SO_4 + 2Ca_3P_2O_8 \rightarrow$$
$$3CaCl_2 + 3CaSO_4 + 4H_3PO_4.$$

The insoluble calcium sulphate is then removed by filteration, and to the filterate are now added one molecule of calcium hydroxide and six molecules of alkali-metal hydroxide, or the sodium hydroxide produced electrolytically, as previously described. This results in the formation of insoluble di-calcium phosphate and the regeneration of the electrolyte sodium chloride as shown by the following equation:

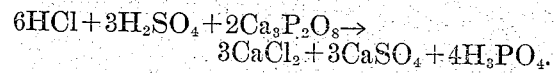
$$3CaCl_2 + 4H_3PO_4 + Ca(OH)_2 + 6NaOH \rightarrow$$
$$4CaHPO_4 + 6NaCl + 8H_2O.$$

The insoluble di-calcium phosphate may be formed also without the use of calcium hydroxide. For example, when sodium hydroxide is added to the filtrate, the following reaction takes place:

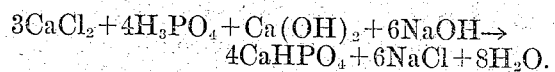
$$2CaCl_2 + 2H_3PO_4 + 4NaOH \rightarrow$$
$$4NaCl + 2CaHPO_4 + 4H_2O.$$

The insoluble di-calcium phosphate of this last reaction is removed by filteration and the mother liquor containing the alkali-metal chloride is again ready for electrolysis, which may be repeated as previously described.

Instead of proceeding as given above, the solution of $3CaCl_2 + 4H_3PO_4$ may be concentrated and then allowed to act on one more molecule of $Ca_3P_2O_8$ according to the following equation:

$$CaCl_2 + 4H_3PO_4 + Ca_3P_2O_8 \rightarrow 3CaCl_2 + 3CaH_4P_2O_8$$

If to this solution the six molecules of sodium hydroxide are added, the insoluble di-calcium phosphate will be precipitated and the electrolyte sodium chloride is regenerated as shown by the following equation:

$$3CaCl_2 + 3CaH_4P_2O_8 + 6NaOH \rightarrow 6CaHPO_4 + 6NaCl + 6H_2O.$$

The insoluble di-calcium phosphate of this last reaction is removed by filtration as before and the mother liquor is then ready for electrolysis, and thus repeat the process continuously.

The equations given above represent the main reactions, but it will be understood that I do not wish to confine myself to the exact equivalents mentioned therein, for small mounts of impurities in the crude rock may necessitate a slight adjustment, but this will in no wise change the spirit of the invention.

Having described my process, what I claim as new, and desire to secure by Letters Patent, is:—

1. The commercial process for the continuous production of di-calcium phosphate, which comprises electrolytically decomposing an alkali-metal chloride solution to produce hydrogen, chlorine and a solution of the alkali-metal hydroxide, simultaneously passing the chlorine and an equivalent amount of sulphur dioxide into water to produce a mixture of hydrochloric and sulphuric acids, treating tri-calcium phosphate with said acid mixture, removing the calcium sulphate resulting from the last reaction, by filtration, then treating the filtrate with a solution of alkali-metal hydroxide, thereby producing di-calcium phosphate and regenerating the alkali-metal chloride.

2. The commercial process for the continuous production of di-calcium phosphate, which comprises electrolytically decomposing an alkali-metal chloride solution to produce hydrogen, chlorine and a solution of the alkali-metal hydroxide, simultaneously passing the chlorine and an equivalent amount of sulphur dioxide into water to produce a mixture of hydrochloric and sulphuric acids, treating tri-calcium phosphate with said acid mixture, to produce calcium chloride, calcium sulphate and phosphoric acid, removing said calcium sulphate by filtration, then treating the filtrate with said electrolytically formed alkali-metal hydroxide, thereby producing di-calcium phosphate and restoring the original alkali-metal chloride.

3. The process as claimed in claim 2, wherein the last named filtrate is treated with calcium hydroxide and sodium hydroxide.

This specification signed and witnessed this 19th day of April, 1927.

AUGUST HOLZ.